United States Patent
Plyler et al.

(10) Patent No.: US 6,292,848 B1
(45) Date of Patent: Sep. 18, 2001

(54) COMPUTING SYSTEM ADAPTER CARD FOR SUPPORTING LEGACY AND PLUG AND PLAY CONFIGURATIONS

(75) Inventors: William Wyche Plyler, Charlotte; Randolph Scot Kolvick, Harrisburg; Eric Allan Billheimer, Charlotte, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/398,008

(22) Filed: Sep. 16, 1999

Related U.S. Application Data

(63) Continuation of application No. 08/874,451, filed on Jun. 17, 1997, now Pat. No. 6,014,714.

(51) Int. Cl.[7] ............................................. G06F 13/10
(52) U.S. Cl. ................................................ 710/8; 710/62
(58) Field of Search ................................. 710/8, 11, 14, 710/62, 65

(56) References Cited

U.S. PATENT DOCUMENTS

| | | | |
|---|---|---|---|
| 4,500,933 | * | 2/1985 | Chan ........................ 360/69 |
| 4,509,113 | * | 4/1985 | Heath ...................... 364/200 |
| 4,604,690 | | 8/1986 | Crabtree et al. ......... 364/200 |
| 5,159,683 | * | 10/1992 | Lvovsky et al. .......... 395/500 |
| 5,379,431 | | 1/1995 | Lemon et al. ............ 395/700 |
| 5,386,567 | | 1/1995 | Lien et al. ................ 395/700 |
| 5,481,696 | * | 1/1996 | Lomp et al. .............. 395/500 |
| 5,491,804 | | 2/1996 | Heath et al. .............. 395/275 |
| 5,497,490 | | 3/1996 | Harada et al. ............ 395/700 |
| 5,504,904 | * | 4/1996 | Dayan et al. ............. 395/700 |
| 5,504,905 | * | 4/1996 | Cleary et al. ............. 395/700 |
| 5,517,646 | | 5/1996 | Piccirillo et al. ......... 395/700 |
| 5,519,851 | * | 5/1996 | Bender et al. ............ 395/500 |
| 5,559,965 | * | 9/1996 | Oztaskin et al. ......... 395/284 |
| 5,619,701 | * | 4/1997 | Neti .......................... 395/674 |
| 5,634,075 | * | 5/1997 | Smith et al. .............. 395/829 |
| 5,640,541 | * | 6/1997 | Bartram et al. .......... 395/500 |
| 5,781,798 | * | 7/1998 | Beatty et al. ............. 395/830 |
| 5,875,415 | * | 2/1999 | Lieb et al. ................ 702/122 |

FOREIGN PATENT DOCUMENTS

WO 96/21899   7/1996  (WO) .................. G06F/12/06

* cited by examiner

Primary Examiner—Thomas Lee
Assistant Examiner—Rehana Perveen
(74) Attorney, Agent, or Firm—Connolly Bove Lodge & Hutz

(57) ABSTRACT

An adapter card which includes a non volatile memory for containing configuration parameters for establishing one of a plurality of configurations for the adapter card, as well as a pair of mapping bits which define the selected configuration. A default configuration is provided which places the adapter card in the legacy configuration during an initial system power up. The default mode also enables the adapter card to listen for a plug and play initialization key sequence, and switch the card configuration to a plug and play configuration. A companion utilities program permits access to the EEPROM for establishing a new set of configuration parameters in the EEPROM, and to change the mapping bits.

11 Claims, 5 Drawing Sheets

COMPUTING SYSTEM ADAPTER CARD FOR SUPPORTING LEGACY AND PLUG AND PLAY CONFIGURATIONS

This is a continuing application of Ser. No. 08/874,451, filed Jun. 17, 1997, now U.S. Pat. No. 6,014,714.

BACKGROUND OF THE INVENTION

The present invention relates to adapter cards for small computer systems. Specifically, an adapter card which may be configured in either a legacy, a plug and play, or a customer unique mapping mode is described.

Personal computers are designed with an open system which provides for expansion capabilities. The central processing for these computers is performed with circuitry which resides on a mother board. The mother board includes various slot interfaces which can receive devices which enhance the computer's utility. These devices may include network cards for connecting the computer to an external network, modems for communicating by telephone with other computers, hard drive and floppy drive controllers, etc. Once installed these devices may be addressed and utilized as a system resource.

All of these expansion devices include an adapter which contains various interface parameters for establishing operating conditions which are compatible with the system bus protocol. In prior art devices, these configuration parameters were preset in the adapter cards before installation and are not changed by the user, or only changed with special utilities software which requires considerable skill to operate. In some instances, conflicts in I/O (Input/Output) addresses, interrupt levels, etc., arise which cannot be resolved by the computer system when several of such expansion devices are in the computer.

A new configuration standard has been proposed which is referred to as a "plug and play" configuration. Adapter cards having the plug and play capability are individually configured by the computer system which assigns I/O addresses, interrupt levels, and other parameters during an initial power up sequence. The system BIOS or the operating system includes routines for individually addressing the adapter cards, assigning a handle for the adapter card, known as a Card Select Number (CSN), and determining the various operating requirements for the adapter cards. Conflicts between the identity of the cards are avoided as a result of the system conducting an inventory of all the connected devices which precedes the assignment of I/O addresses, interrupt levels, and the other parameters.

The use of plug and play adapter cards will undoubtedly prove advantageous to users who have a computer system which accepts the plug and play configuration. However, many systems currently in use do not have a system BIOS or operating system which provides plug and play capabilities. Adapter cards which are only configured for this configuration are not functional in the older legacy systems which only support the pre-existing type of configuration.

After market adapters which are dedicated to a single configuration lack a versatility which permits a user to change resource allocations which is useful whether the system is a plug and play system or the older pre-plug and plug system. Ideally, adapter cards are desirable which are capable of both types of configuration, and which permit a user to modify the configuration through a companion utility program.

BRIEF SUMMARY OF THE INVENTION

The present invention provides an adapter card which is capable of being configured in both a legacy configuration and a plug and play configuration, and which can be reconfigured using a utilities program.

The adapter card includes a non volatile memory such as a EEPROM which stores various parameters such as I/O and memory addresses and interrupt levels, which are necessary to support the card. Additionally, the non-volatile memory stores mapping mode bits which select the configuration logic for the adapter card. During a power up sequence, the mapping mode bits are read and the device assumes the configuration defined by the read bits.

The configuration is set to a default condition prior to installation which places the adapter card in a legacy configuration. However, the adapter card detects the presence of a normal plug and play sequence on the system bus. Logic circuitry on the card then switches to a plug and play configuration permitting configuration parameters to be set from the plug and play routines executed as part of the BIOS routine or from the operating system.

The related utility program permits the adapter card to be programmed in any of several configurations. The utility program issues an alternate key sequence which is recognized by the interface of the adapter card, and enables the logic circuit to decode the subsequent configuration commands for changing the parameters in the non-volatile memory as well as the mapping mode bits. The new non-volatile memory contents establish the adapter card configuration in subsequent system boots.

DETAILED DESCRIPTION OF THE PREFERRED EMBODIMENT

Figure 1:
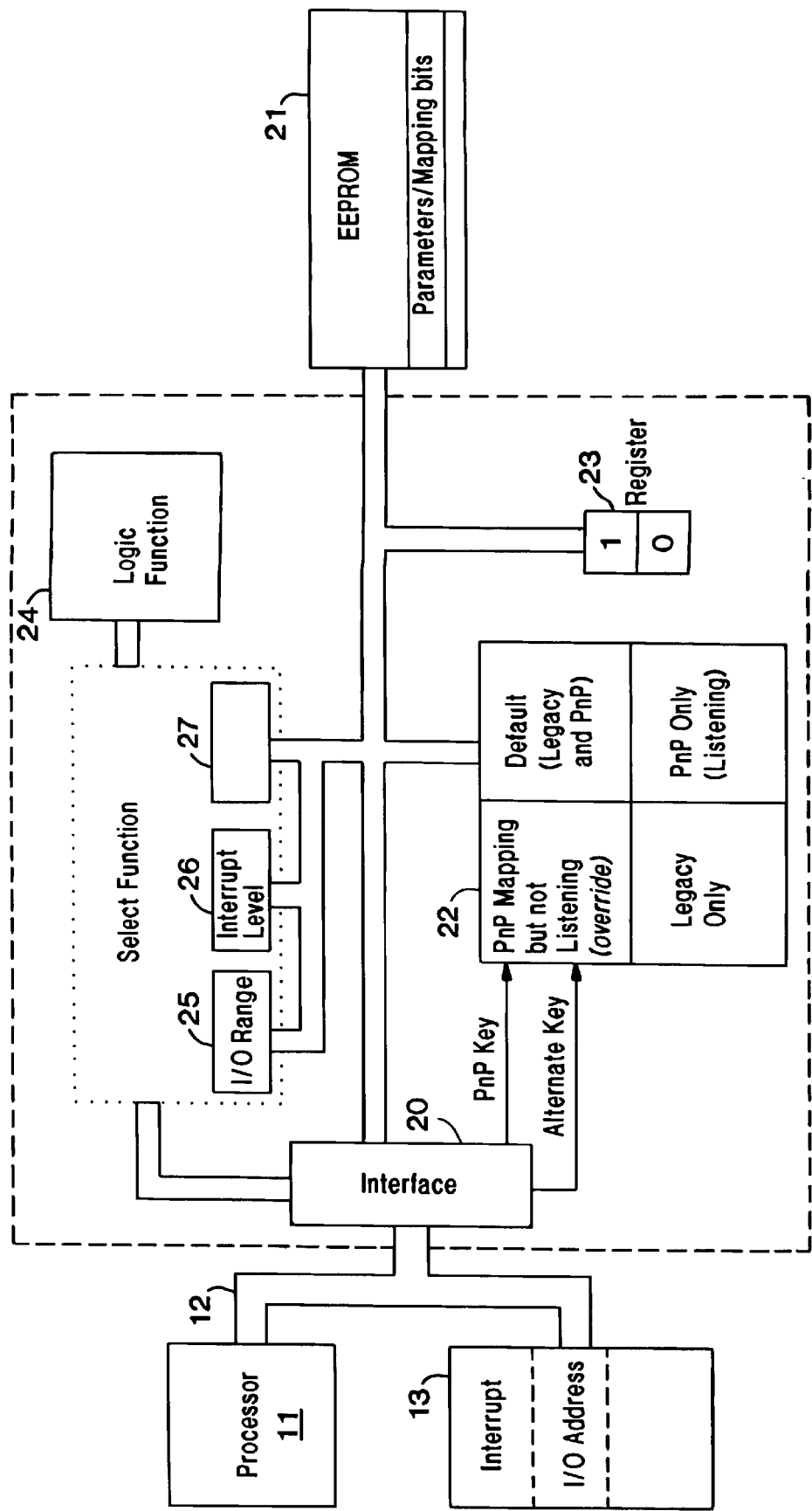
FIG. 1 is a block diagram of an adapter card in accordance with a preferred embodiment of the invention.

FIG. 1 shows a block diagram of the general architecture of the adapter card in accordance with the present invention. The adapter card is received within a slot connected to the system bus 12. The slot has a physical address within the computing system and is addressed by an address bus connected to a processor 11 and system memory 13. The processor 11 configures the various adapter cards connected to the system bus 12 by assigning various parameters such as I/O and memory addresses and interrupt levels to the adapter card.

A non-volatile memory such as EEPROM 21 includes default parameter settings as well as a pair of mapping mode bits. At the time of execution of the system BIOS, the various default parameters such as I/O addressing, interrupt levels, etc. are written to registers 26, 27 and 25, and the mapping mode bits are inserted in register 23. The mapping mode bits register 23 include a first mode bit and a second listening bit which controls whether or not the adapter is listening for a plug and play initialization key sent over the system bus 12.

The data of register 23 can assume four different configurations for the adapter card, representing the particular configuration selected by the user.

| Configuration | Mode | Listening |
|---|---|---|
| Default | 1 | 1 |
| Legacy | 1 | 0 |
| Plug and Play | 0 | 1 |
| Customer Settings | 0 | 0 |

In a first default mode, the adapter card is placed in the legacy mode. Dedicated logic circuitry 22, in response to the default mode indication by the data of live register 23, will configure the card as though it were inserted in a machine which is only supported by a legacy configuration. In this mode, the logic circuitry 22 responds to configuration commands received from the interface 20 from a computing system which only supports adapter cards with a legacy configuration.

The listening bit places the logic circuitry 22 in a listening mode for a plug and play initialization key which would be issued during power-up of the system. During execution of the BIOS routines, or by the initial operating system routines, a plug and play initialization routine may be executed. When the interface 20 recognizes the presence of a plug and play initialization key, the mapping mode bit in register 23 changes to a 0 and the logic circuitry 22 then processes subsequent plug and play configuration commands accordingly. The corresponding value in EEPROM 21 remains however unchanged until a utility program rewrites its contents.

The default data from the EEPROM 21 residing in registers 25, 26 and 27 may be rewritten from the system bus 12 by the processor by conventional plug and play routines executed by the processor 11 if the plug and play configurations are effected or by a companion utility program.

The data in register 23 may also take the value of the mapping mode bits which place the logic circuitry 22 in a legacy only mode, disabling the listening for the plug and play initialization key. Under these conditions, even though a plug and play initialization key has been generated at system power-up the adapter card will not switch to the plug and play mode as was the case when the default mode was selected. Alternatively, the mapping mode bits may be set to a value for plug and play mode only as shown in the table.

The adapter card may assume yet another configuration mode when the data in register 23 is placed in the state by the utility program identified in the table as customer settings permitting changes to any previous configuration parameters set in register 25 to 27. The utility application is capable of accessing the adapter card whether it is either in the plug and play mode, or legacy mode, and whether the adapter card is in the listening mode or not, using a back door alternate initialization key. For systems where the plug and play capability has been adapted, certain older applications or drivers run on these systems may require an adapter to be in the legacy mode. To accommodate these circumstances, the present invention contemplates a logic circuit 22 which when it receives the alternate initialization key generated by the complementary utilities program permits the default data within EEPROM 21 to be changed, and a subsequent execution of the system BIOS or operating system results in changes to the parameters stored in registers 25 to 27.

The adapter of FIG. 1 can be used for implementing virtually any add-on functional logic 24. This includes modem devices, memory controllers, network interfaces and any other peripheral device now served by adapters which are connected to the system bus 12.

The alternate key may be a modification of the plug and play initialization key, for example, by changing the last four bytes of the plug and play initialization key. Or, the alternate key sequence may be unique to each adapter card by having the value hard coded on the adapter card which may be read using the utility program. The Interface 20 connects the logic circuitry 22, EEPROM 21, and the functional device 24 to the system bus 12. Changes to the EEPROM 21 contents and the registers 25–27 are effected by commands received through the interface 20 from the system bus. Changes to the EEPROM 21 contents include not only changing the default parameters, which are loaded to registers 25 to 27 during power up, but additionally changing the mapping bits. For example. the mapping bit which identifies whether or not the adapter is in the plug and play listening mode may be changed to take the adapter out of the listening mode during subsequent power up and BIOS execution, and the adapter is configured in a legacy mode only, and cannot be placed in the plug and play mode by sensing the plug and play initiation sequence.

The adapter card may be placed in the plug and play mode from the default mode, or to the utility program. Once in this mode, all plug and play defined registers and configuration functions can be read and wvritten using the normal plug and play routines of the BIOS routines or the operating system.

The complementary utility software is run by the user establishing a configuration other than the default mode, or take the adapter card out of the plug and play mode, and to read and write to the EEPROM 21. In the preferred embodiment, when a mode change is to be effected by the utility software, the EEPROM 21 contents are changed, and the new mode of operation is effected when the system is rebooted. Changes to register 23, 25, 26, and 27 take effect immediately so a reboot may not be required after running the utility.

The use of the alternate key sequence permits the current adapter to be accessed without accessing other adapters which may be in the system which are configured in the plug and play mode. Thus, even though the adapter is implemented for use with plug and play implemented systems, full control over the adapter configuration is possible by the utility program, to make changes to the configuration parameters for applications which are not compatible with plug and play specifications.

Figure 2:
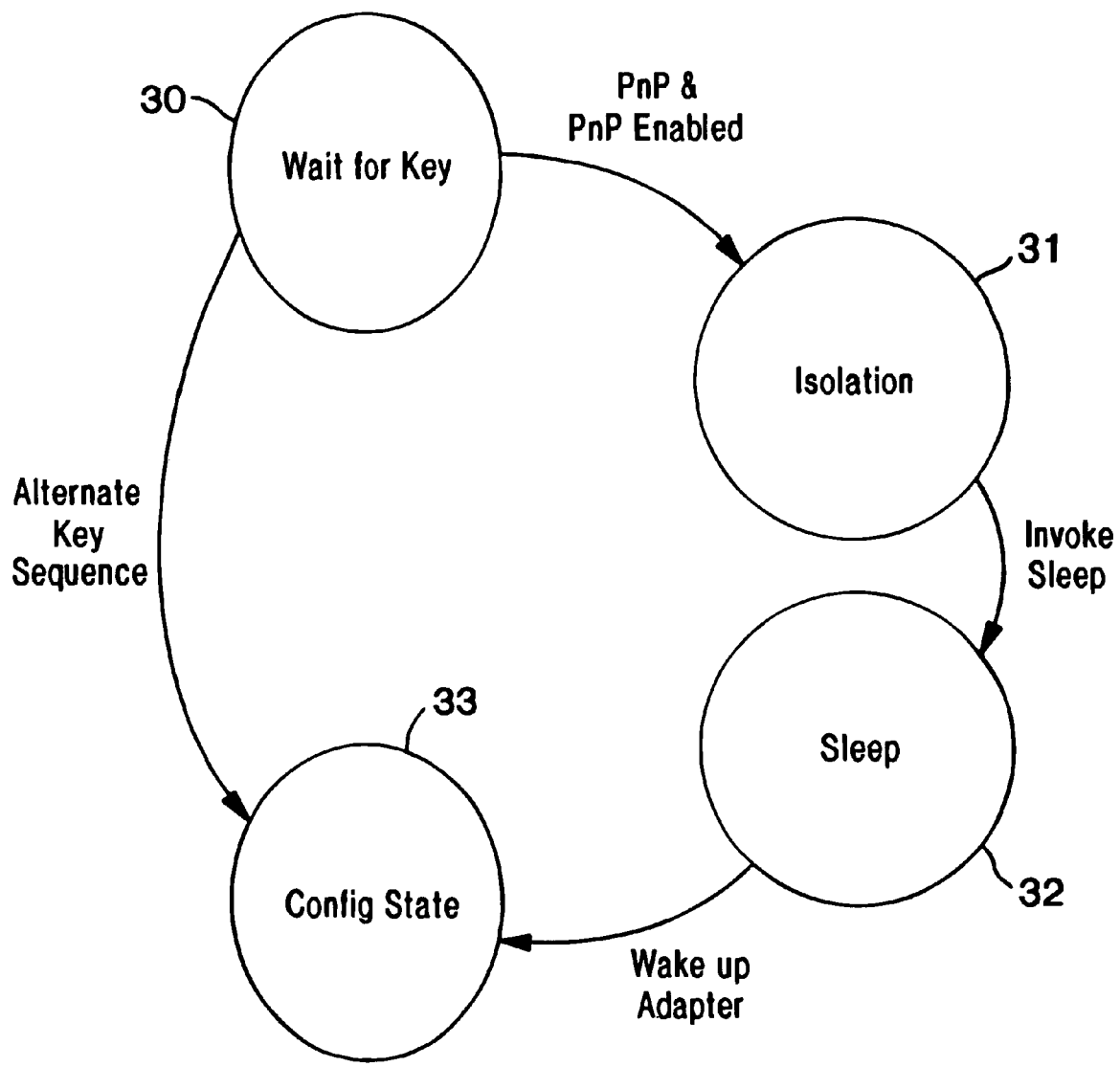
FIG. 2 is a state diagram of the system of FIG. 1 during configuration of the adapter card.

The operation of the adapter card using the alternate key sequence is illustrated in the state diagram of FIG. 2. The adapter card waits in state 30 for a key to be sent over the system bus, which may be the plug and play initialization key sequence or the alternate key sequence. If the plug and play initialization key is detected, the adapter card enters the plug and play isolation state 31 where it receives the plug and play parameters from the system bus and loads the parameters in registers 25 through 27. Following the loading of the parameters, the system leaves the isolation state 30 and enters a sleep state 31. The adapter card can be subsequently set to the configure state from the sleep state 32.

If the alternate key sequence is detected in the wait state 30, the logic circuitry 22 places the device in a configuration state 33, permitting the utility to change the values of the EEPROM 21 as well as those of registers 25 through 27. Once the values of the EEPROM 21 are changed a reboot of the system results in new values being stored to registers 23 and 25 through 27 which establishes one of the default, plug and play, or legacy states.

The adapter card and computing system are interfaced under software control by a driver/configuration program. The driver/configuration program interfaces with the operating system and BIOS program for initializing the configuration of the adapter. As the present adapter is capable of working in systems with are equipped with plug and play capabilities, whether through BIOS execution or operating system execution, the card must be initialized in accordance with the capabilities of the system.

Figure 3:
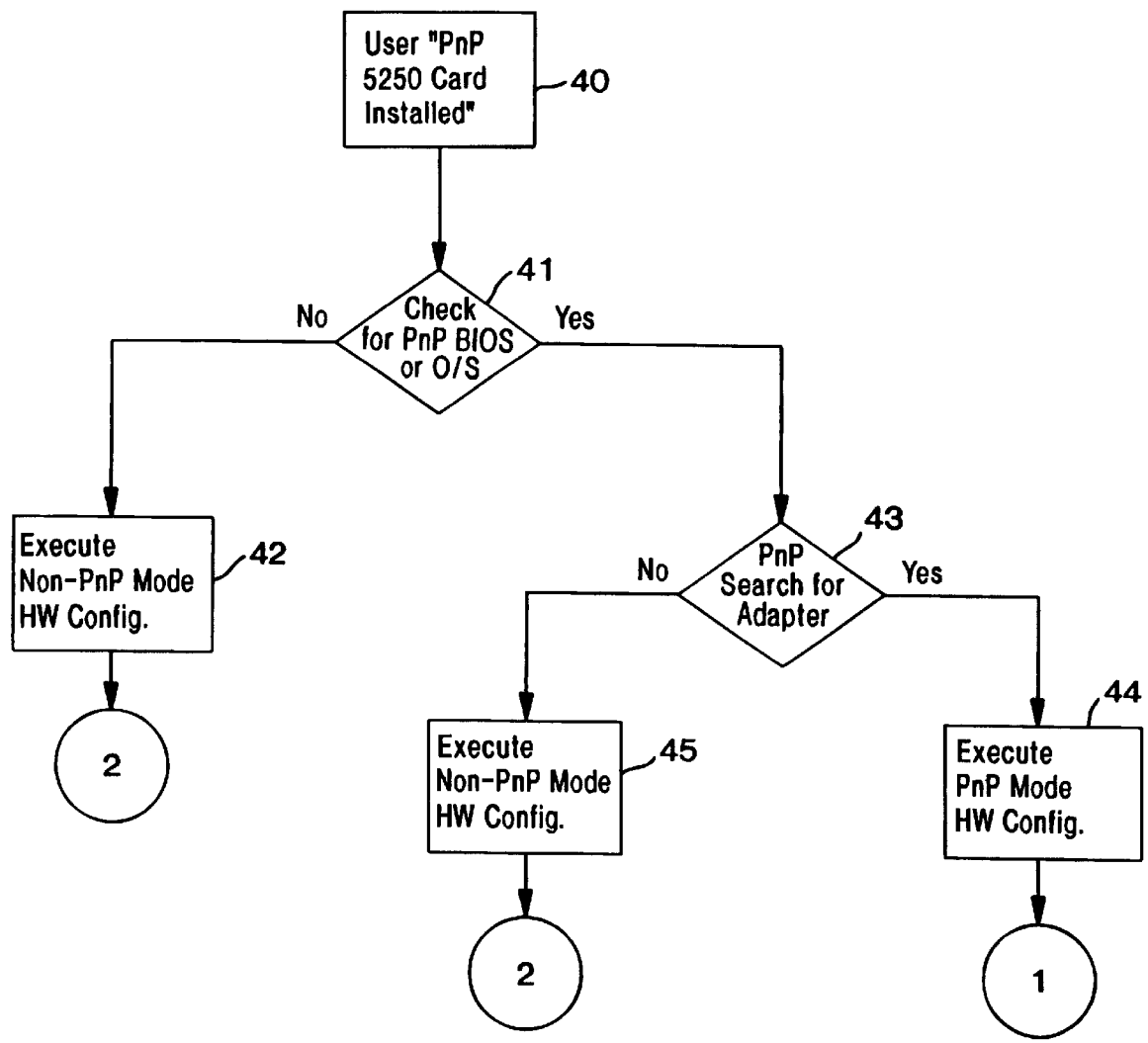
FIG. 3 is a flow chart showing the initial steps formed with a utility application for changing the configuration of the adapter card of FIG. 1.
Figure 4:
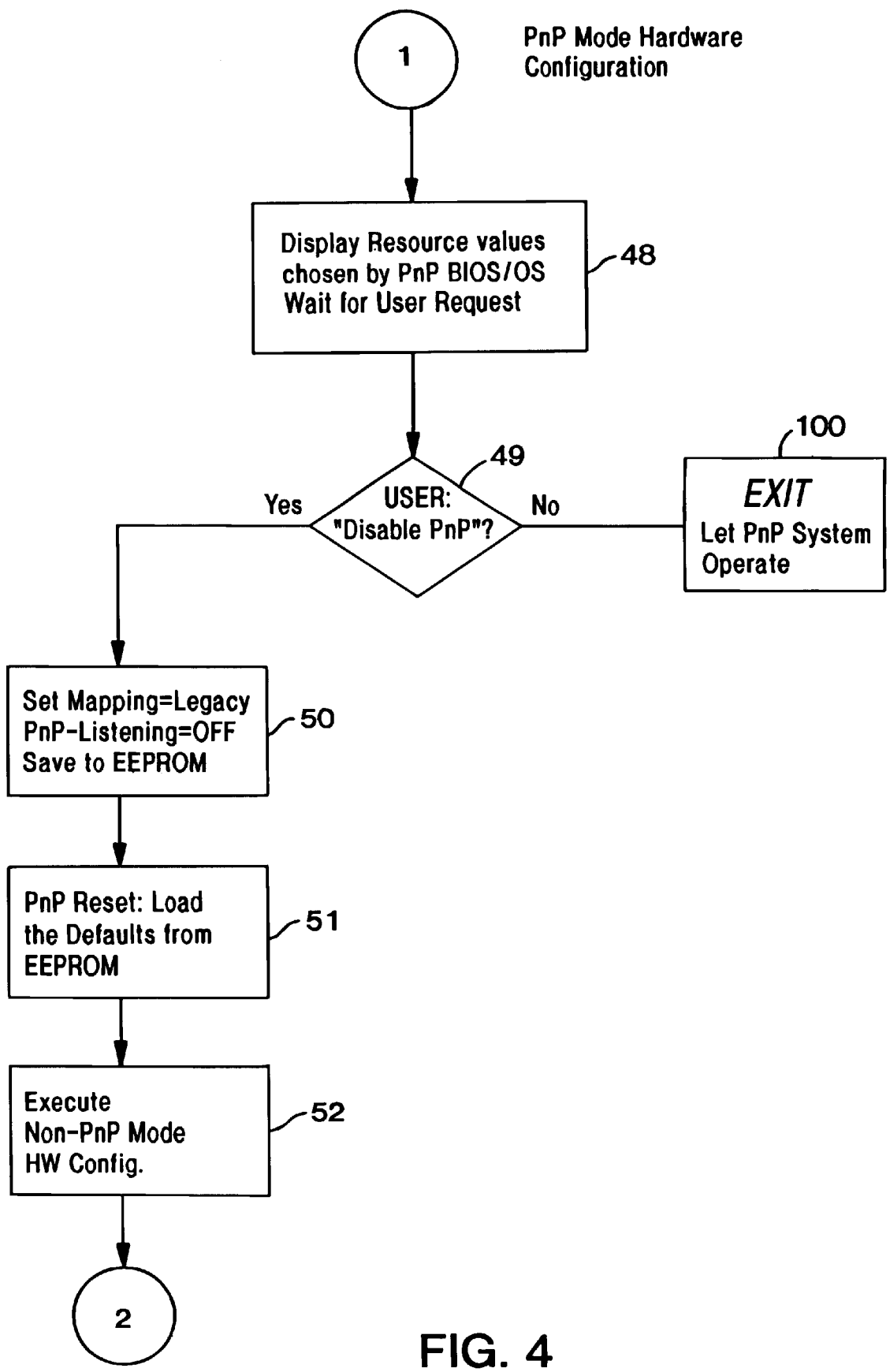
FIG. 4 is a flow chart illustrating that portion of the utility program for disabling the plug and play function.
Figure 5:
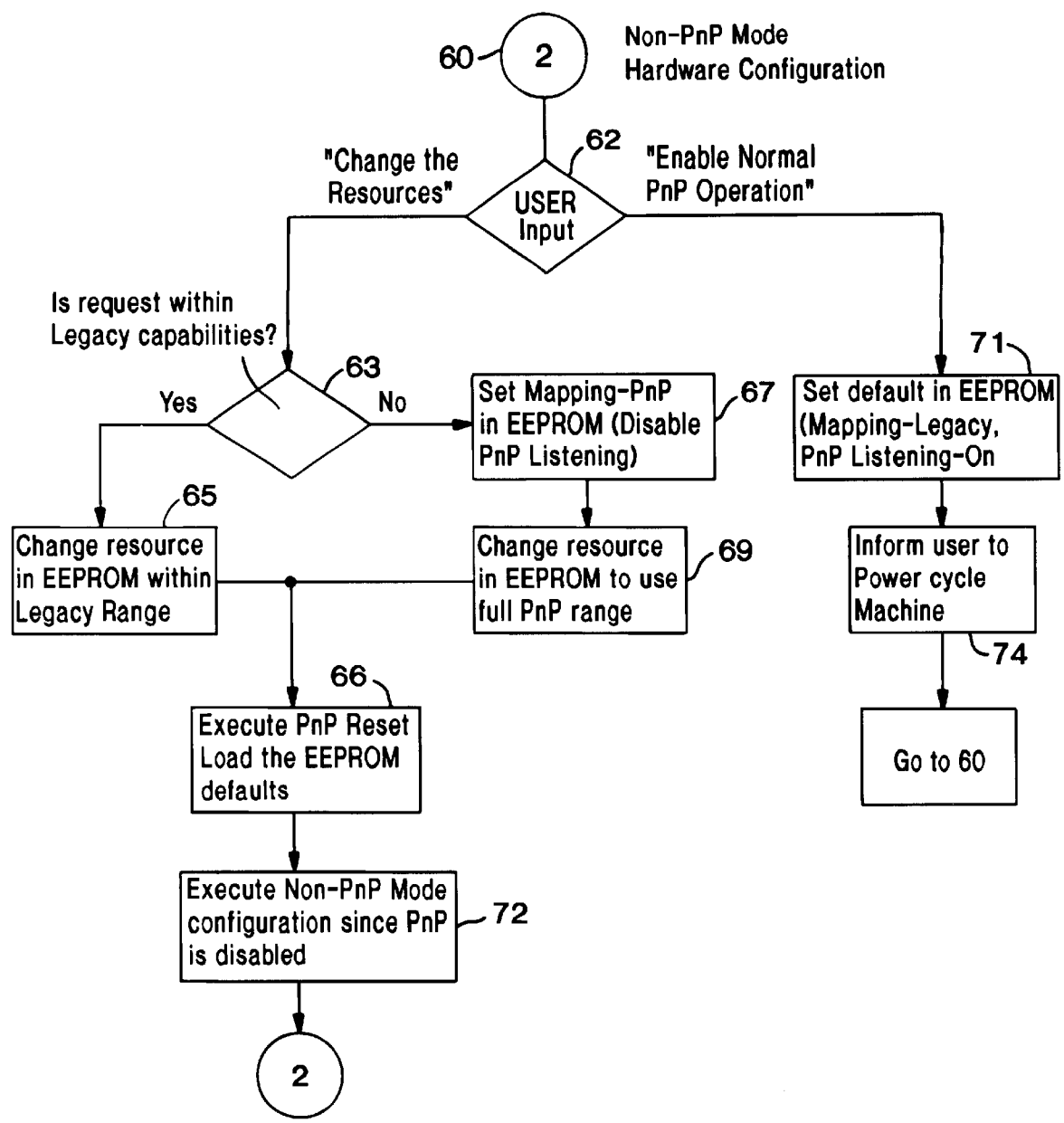
FIG. 5 is a flow chart illustrating that portion of the utility program which permits the system user to change configuration parameters for the adapter card.

An example of the use of the adapter card complementary utility software is illustrated in FIGS. 3 to 5. This software in many aspects emulates the operation of the driver/configuration software as will be evident from the description of the utility.

Referring now to the flow chart of FIG. 3, the execution of the utilities software begins once the user has inserted the adapter card in step 40 within the system bus 12 slot, and loads the utility program for execution. Initially, the utility program permits the user to view and change the contents of registers 25–27 to effect resource choices, as well as setting the mapping bits which were previously set in the EEPROM 21. The utilities program checks in step 41 whether or not a plug and play function has been provided in the computer system BIOS or operating system. If not, the utilities assumes that the card is installed within a legacy computing system, and prepares to execute a non plug and play mode configuration in step 45.

In the event that the system provides for plug and play operation of adapter cards, each adapter card is checked in step 43 to determine whether or not the listening bit has been set to permit listening for the plug and play initialization key. If the bit has not been found set, then the process will proceed with the assumption that the card is in a non-plug and play mode in step 45.

If the listening bit has been found to be set, indicating that the card is listening for the plug and play initialization key, the process proceeds to step 44 on the assumption that the plug and play mode has been configured for the adapter card.

Referring now to FIG. 4, there is shown the steps executed when a plug and play mode has been determined as the configuration mode for the adapter in step 44. The utility program in step 48 will display the various resource values, i.e., the parameters chosen by the earlier plug and play initialization sequence, and then waits for a user's request in step 49. The user may either disable the plug and play mode by typing his selection, or exit the utility program through step 53. If disabling of the plug and play configuration is elected, the utility software issues a normal initialization key sequence, or alternate initialization key sequence. The mapping mode bits arc set to indicate the legacy configuration and the listening bit for controlling whether the adapter card listening bit is set to off in the EEPROM 21 in step 50. Thus, the EEPROM 21 contents have been changed to indicate that in a subsequent reboot of the system the legacy mode will be established for the adapter card, and the ability to listen for plug and play initialization keys is disabled. In this configuration, the adapter card is then accessible by the alternate key sequence only, permitting changes to the adapter card without interfering with other cards that may be set up in the plug and play mode.

The EEPROM 21 is then loaded with new default parameters in step 51. Subsequent execution of step 52 of the BIOS or operating system routine results in the substitute parameters from the EEPROM 21 into registers 25–27 to set up a legacy/non plug and play mode configuration in logic circuitry 22.

FIG. 5 illustrates the utility software execution sequence when the configuration for the adapter has been determined to be a non plug and play mode. The utility enters the routine at 60 shown in FIG. 5, when the determination has been made that the adapter has not been placed in a plug and play operation. This may result because the system does not include any plug and pliy BIOS routines or an operating system which lacks the plug and play capability, or because the adapter card has been set so that there is no listening for a plug and play key sequence by exercising the alternate key sequence. This results in the utility displaying the resource parameters which are loaded from the EEPROM 21. A user indicates a request in step 62 to change the resources, or, to enable the plug and play operation.

If the user has indicated a change in resource selection, by typing in the resource and the corresponding change, step 63 will determine whether or not the resource change is within the legacy mapping capabilities. If it is, the resource (parameter) will be changed in the EEPROM 21 in step 65. When the system is rebooted in step 66, these parameters will be loaded as default parameters from EEPROM 21 to registers 25–27 and the non-plug and play mode is executed in step 67.

In the event that the requested change of resources is not within the legacy capabilities, the mapping bits are set so that the adapter card is in the plug and play mode in step 67 with the listening bit maintained off so that the system does not listen for the plug and play initiating sequence. The resource is then changed in the EEPROM 21 to make full use of the plug and play range in step 69 which was unavailable in the legacy mapping mode.

When the changes are concluded the non-plug and play mode configuration is selected in step 74 as the mapping mode listening bit controlling plug and play listening is in the off state. The program then returns to the beginning step 60, where additional resources or adapters may be located to make any other changes to the resources of the adapter.

In the event during the selection phase, the user has indicated in step 62 to enter a normal plug and play operation, step 71 sets the parameters in EEPROM 21 for the legacy mode, with the plug and play listening bit in the on condition.

The user is then instructed in step 72 to power off, and on again, which loads the EEPROM 21 data to establish the configuration parameters and configuration mode during the execution of the BIOS or operating system.

The utility program then reenters the beginning of the execution sequence in step identified as step 40 of FIG. 3.

Thus, there has been described an adapter and related utility which are capable of controlling the configuration of the adapter card. Those skilled in the art will recognize yet other embodiments of the invention defined by the claims which follow.

What is claimed is:

1. An adapter card for a computing system comprising:
   a non volatile memory for storing configuration parameters for the adapter card as well as data identifying the configuration;
   a plurality of registers for receiving and storing said configuration parameters;
   a system bus interface connecting the adapter card to the computing system bus for receiving configuration commands issued by a central processor connected to said system bus; and
   logic circuitry for configuring said adapter card to one of a plurality of configurations depending on the data identifying the configuration in the non-volatile memory.

2. The adapter card according to claim 1 wherein said logic circuitry in response to one state of said identifying data which defines a default state, establishes a legacy configuration, and switches to a plug and play protocol when a plug and play key sequence appears on said system bus.

3. The adapter card according to claim 1 wherein said system bus interface in response to a utilities program being executed by a control processor writes said data identifying said configuration to said non-volatile memory, wherein said adapter card is subsequently configured with a configuration identified by said data.

4. The adapter card according to claim 1 wherein said registers store a range of I/O ports for said adapter, and an interrupt level for said adapter.

5. An adapter card for a computing system comprising:
   a non volatile memory for storing configuration parameters for the adapter card as well as data identifying the configuration;
   a register for holding the data identifying said configuration during configuration of said adapter card;
   a plurality of registers for receiving and storing said configuration parameters;
   a system bus interface connecting the adapter card to the computing system bus for receiving configuration commands issued by a central processor connected to said system bus; and
   logic circuitry for configuring said adapter card to one of a plurality of configurations depending on the data identifying the configuration in the register for holding the data identifying said configuration.

6. The adapter card according to claim 5 wherein said logic circuitry in response to one state of said identifying data which defines a default state, establishes a legacy configuration, and switches to a plug and play protocol when a plug and play key sequence appears on said system bus.

7. The adapter card according to claim 6 wherein said logic circuitry, in response to a second state of said data identifying said configuration, ignores any plug and play key sequence which appears on said system bus and remains in a legacy configuration.

8. The adapter card according to claim 7 wherein said logic circuitry, in response to a third state of said data identifying said configuration, is only responsive to plug and play configuration commands received over said system bus.

9. An adapter card for a computer system comprising:
   a non volatile memory for storing configuration parameters for the adapter card as well as mapping mode data bits identifying the configuration, said mapping mode data bits including at least one bit which identifies a listening mode for the adapter card;
   a register for holding the mapping mode data bits identifying said configuration during configuration of said adapter card;
   a plurality of registers for receiving and storing said configuration parameters;
   a system bus interface connecting the adapter card to the computer system bus for receiving a plug and play data sequence issued by a central processor connected to said system bus; and
   logic circuitry for configuring said adapter card to one of a plurality of configurations depending on the data identifying the configuration in the register for holding the data identifying said configuration, and for configuring the adapter card to another configuration when said system bus interface produces said plug and play data sequence and said adapter card is a listening mode.

10. The adapter card of claim 9 wherein said mapping mode bits define a default configuration of said adapter card which initially establishes a legacy mode configuration for said adapter card.

11. The adapter card of claim 9 wherein said logic circuitry changes the values of said mapping mode bits in response to a command issued by a utility program running on said computer system.

* * * * *